(12) United States Patent
Fink et al.

(10) Patent No.: US 8,402,821 B2
(45) Date of Patent: Mar. 26, 2013

(54) METHOD AND MONITORING UNIT FOR MONITORING A TIRE OF A MOTOR VEHICLE

(75) Inventors: Alexander Fink, Regensburg (DE); Martin Griesser, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 610 days.

(21) Appl. No.: 12/567,879

(22) Filed: Sep. 28, 2009

(65) Prior Publication Data

US 2010/0083747 A1  Apr. 8, 2010

(30) Foreign Application Priority Data

Sep. 26, 2008 (DE) .................. 10 2008 049 047

(51) Int. Cl.
*B60C 23/02* (2006.01)
(52) U.S. Cl. ...................................... 73/146.5
(58) Field of Classification Search ............ 73/146, 73/146.4, 146.5
See application file for complete search history.

(56) References Cited

U.S. PATENT DOCUMENTS

| | | | | |
|---|---|---|---|---|
| 5,591,906 | A * | 1/1997 | Okawa et al. ............... | 73/146.5 |
| 5,614,882 | A * | 3/1997 | Latarnik et al. ............. | 340/444 |
| 5,880,363 | A | 3/1999 | Meyer et al. | |
| 6,060,984 | A | 5/2000 | Braun et al. | |
| 6,446,023 | B1 | 9/2002 | Ernst | |
| 6,774,776 | B2 * | 8/2004 | Yanase ........................ | 340/444 |
| 7,219,031 | B2 * | 5/2007 | Kawazoe et al. ............ | 702/147 |
| 2004/0178897 | A1 * | 9/2004 | Fennel et al. ................ | 340/442 |
| 2006/0058977 | A1 * | 3/2006 | Zhu .............................. | 702/148 |
| 2008/0238645 | A1 * | 10/2008 | Oshiro ......................... | 340/444 |
| 2008/0243423 | A1 | 10/2008 | Irth et al. | |
| 2010/0025848 | A1 | 2/2010 | Beer et al. | |
| 2010/0179718 | A1 | 7/2010 | Kobe et al. | |

FOREIGN PATENT DOCUMENTS

| | | |
|---|---|---|
| DE | 19803386 A1 | 8/1999 |
| DE | 10105641 A1 | 8/2002 |
| DE | 196 32 150 B4 | 6/2004 |
| DE | 102005014099 A1 | 10/2005 |
| DE | 102004026833 A1 | 12/2005 |
| DE | 102006053826 A1 | 6/2007 |
| DE | 10 2007 007 672 A1 | 8/2007 |
| DE | 102007010781 A1 | 12/2007 |
| DE | 102007029870 A1 | 1/2009 |
| DE | 102009029870 A1 | 2/2010 |
| EP | 1044829 A2 | 10/2000 |

* cited by examiner

*Primary Examiner* — Max Noori
(74) *Attorney, Agent, or Firm* — Laurence A. Greenberg; Werner H. Stemer; Ralph E. Locher

(57) ABSTRACT

A method and a monitoring unit for monitoring a tire of a vehicle record a first measured value of revolutions of a tire with a first sensor. In addition, a second measured value of the revolutions of a tire is recorded with a second sensor. Alternatively, a second measured value of a second, different measured variable of a tire can also be recorded. In a further step, the directly measured or derived measured values of a measured variable are compared and an error signal is generated if a determined deviation is greater than a predefinable tolerance value.

11 Claims, 2 Drawing Sheets

METHOD AND MONITORING UNIT FOR MONITORING A TIRE OF A MOTOR VEHICLE

BACKGROUND OF THE INVENTION

Field of the Invention

The invention relates to a method for monitoring a tire of a vehicle as well as to a monitoring unit for performing the inventive method.

Tire pressure monitoring systems are used for monitoring the tire pressure in motor vehicles in order to enable a dangerous drop in pressure to be detected at an early stage and thereby avoid accidents. Furthermore, maintaining tires at their optimal pressure helps save fuel and avoid unnecessary tire wear.

In the field of tire pressure monitoring systems a distinction is made between direct and indirect systems. Indirect systems do not measure the tire pressure itself. If there is a drop in pressure in a tire, the latter's outer diameter is reduced, thereby increasing the rotational speed of the associated wheel in relation to the other wheels. It is therefore detected when a tire is rotating faster due to loss of air compared to the other three tires. Said increase in rotational speed is detected by the ABS sensors already contained in the vehicle or by the traction control sensors and interpreted as a drop in pressure, as a result of which a warning is issued to the driver. A system of said type is described for example in DE 10 2007 007 672 A1. First and foremost among the shortcomings of said system is the fact that a simultaneous pressure drop in all the tires cannot be detected by such a system.

With direct systems, a sensor is installed inside the tire, on the tire, on the wheel rim or on the valve of the tire, said sensor using wireless communication to transmit the internal pressure of the tire at specific intervals to a central evaluation unit. The evaluation unit then analyzes the pressure value and can generate warnings to the driver, for example if the pressure is too low. Said systems can also detect gradual pressure losses in all tires, since they monitor the pressure directly instead of inferring a possible pressure loss as a consequence of too low a pressure. The driver receives information about the current pressure value in plaintext, which information he/she either sees constantly presented in the display or can request by pressing a button. A system of said kind is described for example in DE 196 32 150 B4.

In addition to measuring the pressure, the system can include further sensors which measure and post-process other physical variables, e.g. the tire temperature or the tire contact area (also known by the term "contact patch").

Although the quality of such tire pressure monitoring systems is steadily improving, erroneous measured values or a total failure of the system can never be ruled out completely. Incorrect measured values can nonetheless represent a considerable safety risk if they lull drivers into a false sense of security or also if the measured values are subject to further processing, e.g. in an electronic stability program, and in this way can provoke unstable driving conditions.

BRIEF SUMMARY OF THE INVENTION

The object underlying the present invention therefore consists in disclosing a method and a monitoring unit which allow a more accurate determination of the tire pressure and exhibit an increased failure resilience compared to conventional systems.

This object is achieved according to the invention by means of a method and/or by means of a monitoring unit as described below.

Accordingly it is provided to perform the following steps in a method for monitoring a tire of a vehicle:
a) record a first measured value of the revolutions of a tire by means of a first sensor;
b) record a second measured value of the revolutions of a tire or a second measured value of a second, different measured variable of a tire by means of a second sensor;
c) compare the first measured value with the second measured value or compare the second measured value with a value of the second measured variable derived from the first measured value or compare a value of a third measured variable of a tire derived from the second measured value with a value of said third measured variable derived from the first measured value;
d) generate an error signal if the determined deviation is greater than a predefinable tolerance value.

Accordingly it is further provided to provide the following means in a monitoring unit for monitoring a tire of a vehicle:
a) means for recording a first measured value of the revolutions of a tire by means of a first sensor;
b) means for recording a second measured value of the revolutions of a tire or a second measured value of a second, different measured variable of a tire by means of a second sensor;
c) means for comparing the first measured value with the second measured value or comparing the second measured value with a value of the second measured variable derived from the first measured value or comparing a value of a third measured variable of a tire derived from the second measured value with a value of said third measured variable derived from the first measured value;
d) means for generating an error signal if the determined deviation is greater than a predefinable tolerance value.

The concept is based on the knowledge that a change in a parameter of a tire, for example pressure, temperature, rotational speed, etc., can be measured in various ways, or that the change in one parameter also provokes a change in another parameter. For example, a drop in the tire pressure causes an increase in the tire contact area, a lowering of the wheel load a reduction in the tire contact area, and so forth. In one embodiment of the invention a measured variable can be measured directly in two different measurement systems and consequently is immediately comparable. An example would be, say, the distance traveled by a tire, the rotational speed of the tire, and so forth. In another embodiment the measured variables are not directly measurable in at least one measurement system. In many cases, however, it is possible to back-calculate to a common measured variable, which again allows a comparison of the associated measured values. In this way a number of sensor problems can be diagnosed, for example sensor failure, sensor drift, increased sensor noise, and individual measurement outliers. Thus, the driver or, as the case may be, electronic systems of the vehicle can be provided with more accurate measured values in that the relaying of obviously incorrect measured values is suppressed, or a failure of the measurement system is reported. By means of per se known systems for localizing a tire on a vehicle it is also possible to output a position-dependent warning to the driver, e.g. "low tire pressure, left front".

Let it be noted at this point that, depending on the way in which the deviation of the measured values is determined, an undershooting of a predefinable tolerance value can also trigger an error signal, e.g. when the greater measured value is subtracted from the smaller measured value in order to determine the deviation. Processing an absolute value of a deviation is therefore of advantage.

Advantageous embodiments and developments of the invention will emerge from the dependent claims as well as from the description in conjunction with the figures of the drawing.

It is advantageous, for example, if the first measured value is determined with the aid of an indirect tire pressure monitoring system and the second measured value with the aid of a direct tire pressure monitoring system. Advantageously, any first and second sensors present, e.g. as required in any case for ABS systems (antilock braking systems) and ESP (Electronic Stability Program) systems, can also be used for the invention in addition to tire pressure monitoring systems. It is possible for the direct tire pressure monitoring system to be monitored by the indirect system and vice versa.

It is also favorable if one or more of the following group is provided as the second or third measured variable: tire pressure, temperature, revolution time, rotational speed, wheel load, surface area of the tire contact area or length of the tire contact area. These are tire parameters which are frequently monitored and referred to for the purposes of a driver warning system. For this reason it is important that these values or, as the case may be, associated warnings are reliable.

It is furthermore advantageous if, instead of the direct comparison of the measured values, there is provided a comparison of the first time derivative of the measured values and/or a comparison of the second time derivative of the measured values and/or a comparison of the direction of change of the measured values and/or a correlation of the measured values over a predefinable time period. It is often of advantage not to compare measured values directly, since these represent only a snapshot, but to refer to a time characteristic curve for assessing the correctness of the measured values. If, for example, two measurement systems determine the same value for a pressure, different gradients, for example, can nonetheless indicate an error. The correlation of two measured values is also a suitable indicator for identifying a system error.

It is also advantageous if in step c), instead of the comparison of a first measured value and a second measured value of the same measured variable, a reasonableness check of a first measured value and a second measured value of different measured variables is performed and if in step d) an error signal is generated if the reasonableness check yields an implausible result. If a direct comparison of different measured values of the same measured variable is not possible, yet a certain correlation exists between the available measured variables or parameters derived therefrom, at least an estimation or reasonableness check can be performed. Examples of implausible pairs are, for instance, decreasing revolution time together with increasing rotational speed, reduction in the tire contact area together with increasing wheel load, reduction in the tire contact area together with decreasing tire pressure, reduction in the effect of a longitudinal acceleration on an acceleration sensor installed in the tire when the vehicle accelerates. A reasonableness check can also be carried out when the determined measured values would in fact allow a back-calculation to the same measured variable and a direct comparison of the measured values. This variant of the invention can be followed in particular when a simplified form of tire monitoring is to be performed. For example, instead of direct comparison of the tire pressure it is possible simply to perform a reasonableness check of wheel rotational speed and tire pressure. A decreasing wheel rotational speed (compared to the rotational speed of the remaining wheels) at the same time as falling tire pressure, for example, is implausible.

Finally it is favorable if the comparison means and the means for generating an error signal are disposed in a semiconductor device and the receiving means represent at least one input and/or a radio receiving module of the same. Semiconductor devices are small, fault-tolerant and easily available. For that reason it is favorable to have the inventive functions execute in such a semiconductor device, e.g. a microprocessor with memory. It is, however, also possible to integrate the inventive method, or the means necessary therefor, into an onboard vehicle electronics system that is already present in any case.

The above embodiments and developments of the invention can be combined in any number of ways.

BRIEF DESCRIPTION OF THE SEVERAL VIEWS OF THE DRAWING

The present invention is explained in more detail below with reference to the exemplary embodiments depicted in the schematic figures of the drawing, in which.

DESCRIPTION OF THE INVENTION

Figure 1:
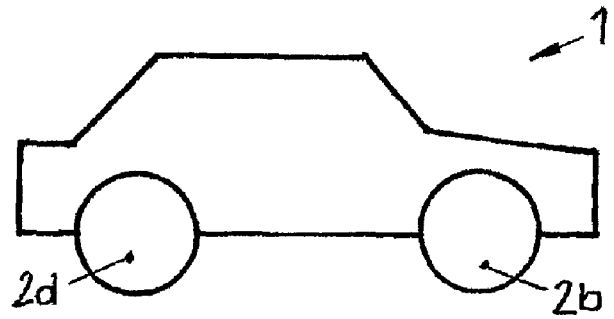
FIG. 1 shows a vehicle comprising the inventive system in plan view and side view
Figure 1:
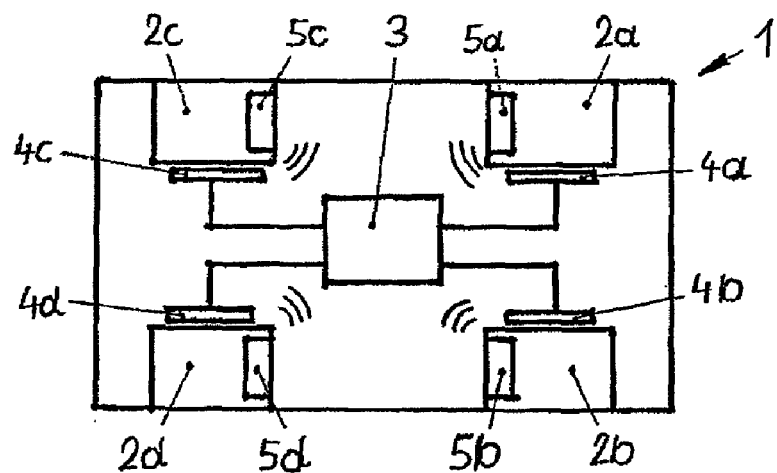

Unless expressly stated otherwise, identical and functionally identical elements and features are labeled with the same reference signs in all the figures of the drawing.

FIG. 1 shows a vehicle 1 in side view and plan view. The vehicle 1 includes 4 wheels 2a . . . 2d, each with associated first sensors 4a . . . 4d and second sensors 5a . . . 5d and a monitoring unit 3.

Figure 2:
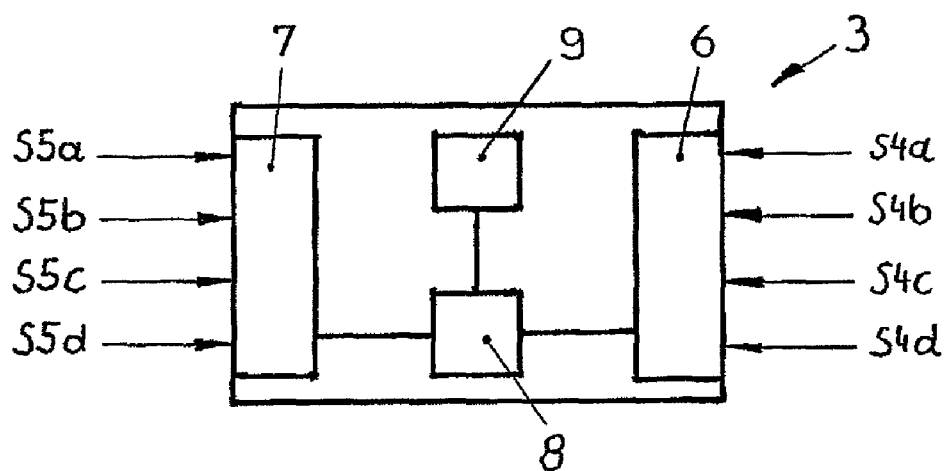
FIG. 2 shows the most important components of a monitoring unit

FIG. 2 shows a detailed drawing of the monitoring unit 3. The latter comprises an input module 6 for recording the signals S4a . . . S4d of the first chassis-mounted sensors 4a . . . 4d and a receiver 7 for recording the wirelessly transmitted signals S5a . . . S5d of the second sensors 5a . . . 5d. In addition the measurement system 3 includes a microcontroller 8 and a memory 9. The memory 9 can be provided inter alia for the purpose of storing the data necessary for the inventive method as well as workflows. Usually the method will be stored in the form of a program in the memory 9. The microcontroller 8 reads out the latter and executes the method step by step. The monitoring unit 3 can also be part of a vehicle onboard computer (not shown) which also performs other control tasks of the vehicle 1. Where appropriate, the parts of the monitoring device are then to be regarded not as physical but as functional blocks. For the sake of simplicity, however, it is assumed in the following that the monitoring unit 3 is a separate device.

Figure 3:
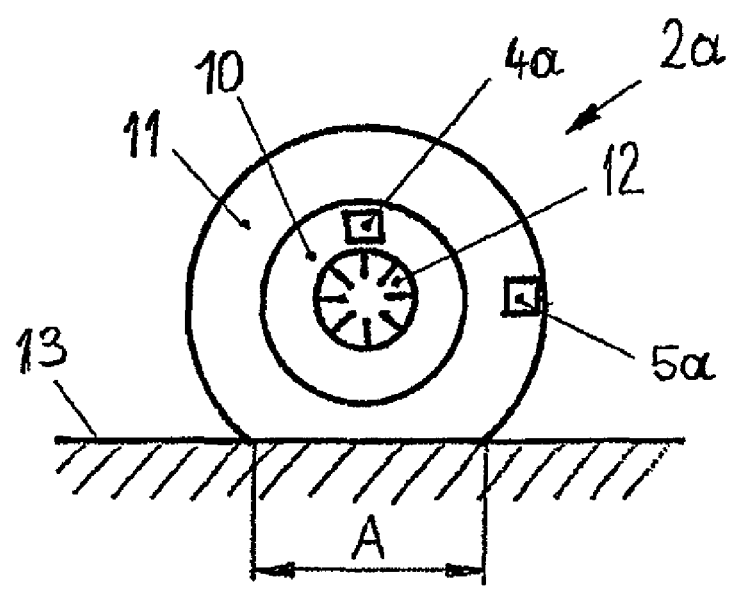
FIG. 3 shows a wheel in a detail view

FIG. 3 shows the wheel 2a in a detailed representation. The wheel 2a, which is standing on a road surface 13, comprises a wheel rim 10, a tire 11 mounted thereon and a graduated code disk 12 mounted thereon. Due to the wheel load the tire 11 deforms in the region of the tire contact area A (also known by the term "contact patch") and at that point assumes the shape of the road surface, which in the example shown is flat.

In a first step a) a first measured value of the revolutions of a tire 11 is recorded by means of a first sensor 4a. The first sensor 4a is provided in order to measure the revolutions or, as the case may be, the angular position of the wheel 2a. In the example shown this is achieved in a per se known manner by means of a reflection sensor or forked light barrier and a graduated code disk 12. The light/dark differences are detected by the first sensor 4a and converted with the aid of electronics connected downstream thereof into a number of (partial) revolutions. Per se, however, the count pulses of the photoelectric barrier can also be post-processed directly as revolution-equivalent. With a high number of light/dark changes applied to the graduated code disk 12, a high angular resolution is possible in this case, with only a low angular resolution being possible if the number is small. In vehicle manufacture use is also frequently made of chopper or apertured disks, in which case because of the susceptibility to dirt a Hall sensor can also be used in place of an optical sensor provided the chopper or apertured disk is made of metal. In principle, of course, capacitive and inductive sensors are also conceivable for measuring the revolutions of the wheel 2a.

The revolutions of the wheels 2a . . . 2d can be determined with little additional overhead also by evaluation of the wheel rotational speed signals, as required in any case for example for ABS systems (antilock braking systems) and ESP (Electronic Stability Program) systems. In this case a segment (or also tooth) in the wheel rotational speed sensor is defined as a zero point at a specific time, e.g. when the ignition is switched on. Referred to this position, the following revolutions can then be calculated based on a count of the number of segments (or teeth) passed.

In a first example, in a second step b) a second measured value of the revolutions of a tire 11 is recorded with the aid of a second sensor 5a. The second sensor 5a is likewise provided in order to measure the revolutions of the wheel 2a, albeit in a different way from the first sensor 4a.

This can be determined comparatively easily e.g. by means of an acceleration sensor mounted permanently to the tire 11. Although superimposed accelerations such as, for example, the centrifugal acceleration, accelerations of the vehicle, as well as the gravitational acceleration act on the wheel 2a, since the gravitational acceleration always points toward the center of the earth, variations result in the absolute value of the acceleration acting on the acceleration sensor. Between two maximum values or two minimum values there lies one revolution of the wheel. Longitudinal accelerations of the vehicle 1 can be taken into account e.g. by means of an additional acceleration sensor permanently installed in the vehicle 1. Intermediate positions of the wheel 2a, i.e. parts of a complete revolution, can be taken into account e.g. by interpolation.

A further possibility of determining the revolutions of the wheel 2a is to use a piezoelectric sensor incorporated in the tread of the tire 11, which sensor is not distorted in the region of the tire contact area A, is slightly distorted outside of the tire contact area A, and is extremely distorted in a transitional region. The position of the wheel 2a can be deduced from this deformation pattern. Since the tire contact area A is dependent inter alia on the wheel load and the tire pressure, evaluating the middle position in the tire contact area A is advantageous. Between two middle positions there once again lies one full revolution of the wheel 2a.

The deformation energy converted into electrical energy by a piezoelectric crystal can advantageously be used also for supplying power to the second sensor 5a. It may then be possible to dispense completely with a battery. It is, however, also possible to support an existing battery or alternatively to charge a capacitor that will ensure the power supply for a certain period of time. Because of the changing polarity of the voltage generated by the piezoelectric elements it is additionally necessary to provide a rectifier.

Evaluation of the tire contact area A is not, of course, limited to piezoelectric sensors, but is also applicable to other signal transducers. For example, microcontacts, variable resistors, variable capacitors, or impact sensors may be cited at this point. However, the principle always remains the same: a change in the output signal of the sensor 5a occurs upon entering and/or exiting or, as the case may be, traversing the tire contact area A.

This is immediately evident in the case of microcontacts. In this case a simple switching contact is installed in the tire 11 in such a way that it opens or closes, depending on the design of the contact, when the relevant part of the tread comes into contact with the road surface 13.

Examples of capacitive sensors or resistance sensors would be, for instance, two electrodes separated by a dielectric or a resistance layer. When pressure is applied, i.e. when the relevant part of the tread comes into contact with the road surface 13, the electrodes come closer to one another and change the capacitance and/or resistance of the sensor. This can easily be tapped with the aid of an applied DC or AC voltage.

In a third step c) the first measured value is now compared with the second measured value. This is possible by forming a difference, determining the quotient, simple less than/ greater than comparison and the like.

In a fourth step d) an error signal is subsequently generated if the determined deviation is greater than a predefinable tolerance value. Measured values are by nature also subject to variations when the underlying measured variable remains the same. This is caused for instance by measurement tolerances of the sensors as well as by what is termed "jitter", i.e. time variations of the measurement. Said unavoidable deviations should not lead to an error signal. Starting from a certain deviation of the measured values, however, it can be assumed with a relatively high degree of certainty that one of the two sensors 4a and 5a is delivering an incorrect measurement result. A suitable tolerance value would need to be determined empirically for example.

In a second example, in a second step b), a second measured value of a second measured variable of a tire 11 that is different from the revolution of a tire 11 is determined by means of a second sensor 5a. In concrete terms the second sensor 5a is embodied as a per se known pressure sensor which measures the air pressure inside the tire 11.

In a third step c) the second measured value is now compared with a value for the second measured variable derived from the first measured value. The second measured value can be measured directly by means of the pressure sensor, whereas a value for the pressure must first be derived from the first measured value, the revolution of a wheel. If the pressure in a tire 11 drops, this leads to a reduction in the effective radius and consequently an increase in the rotational speed of the wheel in comparison with the other wheels of the vehicle 1. The tire pressure can be back-calculated from the size of the change in rotational speed. Thus, two measured values of one and the same measured variable, each of the two values determined in different ways, are available.

In a fourth step d), analogously to the first example, an error signal is generated when the determined deviation is greater than a predefinable tolerance value.

In a third example, in a second step b) the time required to traverse the tire contact area A is measured. This can be accomplished in a simple manner using the sensors known from the first example together with a timer. In the case of an acceleration sensor, use can be made here of the fact that no acceleration apart from gravitational acceleration is effective inside the tire contact area A.

In a third step c) a value for a third measured variable of a tire 11 that has been derived from the second measured value is now compared with a value for the third measured variable that has been derived from the first measured value. In this case the third measured variable is again to be the tire pressure. Although in fact neither of the two sensors 4a and 5a has directly measured the tire pressure, a comparison of the same is nonetheless possible. In the second example it was shown that the tire pressure can be back-calculated by measuring the revolutions. The same is possible with the aid of the time necessary for traversing the tire contact area, since as the tire pressure decreases the tire contact area is lengthened. If the rotational speed is known, the length of the tire contact area can now easily be back-calculated from the measured time, and the tire pressure from the tire contact area length.

In a fourth step d), analogously to the first and second example, an error signal is generated if the determined deviation is greater than a predefinable tolerance value.

In a fourth example, in a second step b) the tire temperature is measured by means of a per se known temperature sensor.

In a third step c), instead of the comparison of a first measured value and a second measured value of the same measured variable, a reasonableness check of a first measured value and a second measured value of different measured variables is carried out. Deducing the temperature of a tire 11 from its revolution is possible only with very great difficulty. For this reason a simplified reasonableness check of the gradients of the measured values is performed in this case.

In step d), an error signal is thus generated when the reasonableness check yields an implausible result. For example, a falling tire temperature, i.e. a negative gradient, in combination with an increase in rotational speed of the wheel, i.e. a positive gradient, is not plausible, since one would actually expect an increase in the tire temperature. For this reason a warning signal should be output—advantageously only when a predefinable tolerance threshold is exceeded.

In addition to the example shown there are also a large number of other exemplary instances of a reasonableness check. Incorrect pairings in each case are indicated below: decreasing revolution time together with increasing rotational speed; reduction in the tire contact area together with increasing wheel load; reduction in the tire contact area together with decreasing tire pressure; reduction in the effect of a longitudinal acceleration on an acceleration sensor installed in the tire together with a decrease in the rotational speed of the tire 11.

A reasonableness check can also be carried out when the determined measured values would actually allow a back-calculation to the same measured variable and a direct comparison of the measured values. This variant of the invention can be followed in particular when a simplified form of tire monitoring is to be performed. For example, instead of the direct comparison of the tire pressure shown in the second example it is possible simply to perform a reasonableness check of wheel rotational speed and tire pressure. For example, a decreasing wheel rotational speed at the same time as falling tire pressure is implausible.

In a fifth example there is provided for the first sensor 4a, not, as in the preceding examples, a forked light barrier, a reflection sensor, a Hall sensor, a capacitive sensor or an inductive sensor, but a type of sensor as provided in the preceding examples in fact for the second sensor 5a. The first sensor 4a for measuring the revolutions of a wheel can therefore be in the following for example an acceleration sensor, a piezoelectric sensor, a microswitch, a variable resistor, a variable capacitor, or an impact sensor which is installed in or on the tire 11. In a first step a), however, a revolution of a wheel 2a or its rotational speed is measured once again.

In a second step b) the tire pressure is measured as in the second example by means of a second sensor 5a which is likewise installed in or on the tire 11. The second sensor 5a is again embodied as a per se known pressure sensor. In this case the first sensor 4a and the second sensor 5a can of course be installed in a common housing in order to facilitate their installation in or on the tire 11.

The steps c) and d) are performed analogously to the second example. In principle, therefore, those functions that are usually performed by an indirect tire pressure monitoring system, namely the monitoring of a tire pressure on the basis of a measured rotational speed, are also performed by a direct system, i.e. sensors installed in or on the tire. Although the tire pressure can, as mentioned, simply be measured by means of a pressure sensor, the measured value determined via a revolution or rotational speed sensor installed directly in or on the tire can be used for checking the value determined by means of the pressure sensor. Other measured variables can, of course, be checked in an analogous manner to the above-described examples.

It should be pointed out at this juncture that in the examples shown the steps a) and b) in particular do not have to be executed in the specified order or alternatively can even be processed in parallel. Furthermore, the signals of all first sensors 4a . . . 4d and second sensors 5a . . . 5d can be recorded in one measurement cycle or else also sequentially.

In light of the continuing miniaturization of electronic and electromechanical components it is also pointed out that electromechanical sensors can, of course, also be produced using the per se known MEMS technology.

Finally it is also made clear that the arrangement of the monitoring unit 3 in the vehicle 1 is not mandatory. Rather, the monitoring unit 3 can also be installed directly together with one or more sensors in a common housing that is mounted on or in the tire. Finally the signals of all of the sensors shown in FIG. 1 are not necessarily supplied to the monitoring unit. It is also conceivable that only two or more signals are fed to the monitoring unit.

The invention claimed is:

1. A method for monitoring a tire of a vehicle, the method comprising the following steps:
    a) recording a first measured value of revolutions of the tire with a first chassis-mounted sensor;
    b) recording a second measured value of the revolutions of the tire or a second measured value of a second, different measured variable of the tire with a second sensor of a direct tire pressure monitoring system;
    c) determining a deviation by comparing the first measured value with the second measured value or comparing the second measured value with a value of the second measured variable derived from the first measured value or comparing a value of a third measured variable of the tire derived from the second measured value with a value of the third measured variable derived from the first measured value; and
    d) generating an error signal if the determined deviation is greater than a predefinable tolerance value.

2. The method according to claim 1, which further comprises providing one or more of the following group of measured variables as the second or third measured variable: tire pressure, temperature, revolution time, rotational speed, wheel load, surface area of tire contact area or length of tire contact area.

3. The method according to claim 1, which comprises, rather than performing a direct comparison of the measured values, carrying out one or more of the following: comparing the first time derivative of the measured values, comparing the second time derivative of the measured values, comparing a direction of change of the measured values, correlating the measured values over a predefinable time period.

4. The method according to claim 1, which further comprises carrying out step c) by performing a reasonableness check of a first measured value and a second measured value of different measured variables, rather than a comparison of a first measured value and a second measured value of the same measured variable, and carrying out step d) by generating an error signal if the reasonableness check yields an implausible result.

5. A monitoring unit for monitoring a tire of a vehicle, the monitoring unit comprising:
   a) means for recording a first measured value of revolutions of the tire with a first chassis-mounted sensor;
   b) means for recording a second measured value of the revolutions of the tire or a second measured value of a second, different measured variable of the tire with a second sensor of a direct tire pressure monitoring system;
   c) means for comparing the first measured value with the second measured value or comparing the second measured value with a value of the second measured variable derived from the first measured value or comparing a value of a third measured variable of the tire derived from the second measured value with a value of the third measured variable derived from the first measured value; and
   d) means for generating an error signal if the determined deviation is greater than a predefinable tolerance value.

6. The monitoring unit according to claim 5, wherein one or more of the following group of measured variables is provided as the second or third measured variable: tire pressure, temperature, revolution time, rotational speed, wheel load, surface area of a tire contact area or length of a tire contact area.

7. The monitoring unit according to claim 5, wherein rather than directly comparing the measured values, said comparing means is configured to perform at least one of the following: a comparison of the first time derivative of the measured values, a comparison of the second time derivative of the measured values, a comparison of a direction of change of the measured values, a correlation of the measured values over a predefinable time period.

8. The monitoring unit according to claim 5, wherein a reasonableness check of a first measured value and a second measured value of different measured variables is provided, rather than a comparison of a first measured value and a second measured value of the same measured variable, and an error signal is generated if the reasonableness check yields an implausible result.

9. The monitoring unit according to claim 5, which further comprises a semiconductor device, said means for comparing and said means for generating an error signal being disposed in said semiconductor device, and at least one of a receiving means representing at least one input or a radio receiving module of said semiconductor device.

10. A monitoring unit for monitoring a tire of a vehicle, the monitoring unit comprising:
    a) a first chassis-mounted sensor configured for monitoring a tire pressure and for recording a first measured value of revolutions of the tire;
    b) a second sensor configured for directly monitoring the tire pressure and for recording a second measured value of the revolutions of the tire or a second measured value of a second, different measured variable of the tire;
    c) a device for comparing the first measured value with the second measured value or comparing the second measured value with a value of the second measured variable derived from the first measured value or comparing a value of a third measured variable of the tire derived from the second measured value with a value of the third measured variable derived from the first measured value; and
    d) a device for generating an error signal if the determined deviation is greater than a predefinable tolerance value.

11. A method for monitoring a tire of a vehicle, the method comprising the following steps:
    a) recording a first measured value of revolutions of the tire with a first chassis-mounted sensor;
    b) recording a second measured value of the revolutions of the tire or a second measured value of a second, different measured variable of the tire with a second sensor;
    c) determining a deviation by performing one or more of the following process steps:
       comparing a first time derivative of the measured values;
       comparing a second time derivative of the measured values;
       comparing a direction of change of the measured values; or
       correlating the measured values over a predefinable time period; and
    d) generating an error signal if the determined deviation is greater than a predefinable tolerance value.

* * * * *